United States Patent [19]

Stern et al.

[11] 4,130,697

[45] Dec. 19, 1978

[54] PROCESS FOR THE PRODUCTION OF FOAMED PLASTICS WITH IMPROVED COMBUSTION CHARACTERISTICS

[75] Inventors: Gerhard Stern; Karlheinz Wegleitner, both of Linz, Austria

[73] Assignee: Chemie Linz Aktiengesellschaft, Austria

[21] Appl. No.: 819,504

[22] Filed: Jul. 26, 1977

[30] Foreign Application Priority Data

Jul. 30, 1976 [DE] Fed. Rep. of Germany ....... 2634417

[51] Int. Cl.$^2$ ...................... C08G 18/54; C08G 18/15
[52] U.S. Cl. .................................. 521/106; 521/119; 521/136; 521/174
[58] Field of Search ........ 260/2.5 BE, 2.5 F, 2.5 AM

[56] References Cited

U.S. PATENT DOCUMENTS

| | | | |
|---|---|---|---|
| 3,632,531 | 1/1972 | Rush | 260/2.5 AM |
| 3,806,006 | 9/1957 | Proctor | 260/2.5 AM |

FOREIGN PATENT DOCUMENTS

| | | | |
|---|---|---|---|
| 1918181 | 8/1970 | Fed. Rep. of Germany | 260/2.5 BE |
| 908303 | 10/1962 | United Kingdom | 260/2.5 BE |
| 1029963 | 5/1966 | United Kingdom. | |

*Primary Examiner*—C. Warren Ivy
*Attorney, Agent, or Firm*—Wenderoth, Lind & Ponack

[57] ABSTRACT

Foamed plastics with improved combustion characteristics are produced by condensing an aqueous solution of formaldehyde-urea and/or melamine precondensates with polyisocyanates and optionally a polyol in the presence of an acid catalyst, being present in an amount of 1 part by weight per at least 20 parts by weight of precondensate, whereby this catalyst is added to the isocyanate before mixing with the precondensate or to the mixture of isocyanate and precondensate, but separately from the precondensate.

9 Claims, No Drawings

PROCESS FOR THE PRODUCTION OF FOAMED PLASTICS WITH IMPROVED COMBUSTION CHARACTERISTICS

The subject of the present invention is the manufacture of foamed plastics with improved combustion characteristics by a condensation reaction of aqueous solutions of aminoplast precondensates with organic isocyanates by means of so-called "acid" catalysts in an economical and simple, that is to say one-stage, process, with which process the customary after-curing of the end products also becomes superfluous.

Processes for the manufacture of aminoplast/isocyanate condensation products with the aim of combining the good properties of the two types of plastics, that is to say the aminoplasts and the polyurethane plastics, with one another are known.

Thus, for example, according to U.S. Pat. Spec. No. 3,632,531, polyurethane foams are obtained by a condensation reaction from organic polyisocyanates and so-called "methylol resins", that is to say aminoplast precondensates, under the catalytic action of organic tin salts and secondary or tertiary amines. The disadvantage is that the water content of the reaction system in this process and in the other similar processes known hitherto should be far below 10% and this means that aminoplast precondensate solutions which, by reason of their industrial manufacture, contain considerable amounts of water have first to be evaporated before they are used. Furthermore, after-curing is necessary in order to achieve optimum flame resistance and the necessary mechanical strength.

On the other hand, acid compounds have been regarded as condensation retarders for polyurethanes (see, for example, Kunststoff-Handbuch (Plastics Handbook) Carl Hauser Verlag, Volume X, 1966, page 151.

Furthermore, according to DT-OS 1,918,181, the manufacture of foams from urea/formaldehyde or melamine/formaldehyde resins, but above all phenol/-formaldehyde resins, by reaction with isocyanates in two stages is known, the formaldehyde resin first being produced in the presence of acid catalysts and in the presence of a blowing agent, such as fluorinted hydrocarbons, and the isocyanate being added only subsequently. Since, as is known, urea/formaldehyde, melamine/formaldehyde and phenol/formaldehyde resins rapidly undergo a complete condensation reaction in an acid medium, only a few OH groups are still available for the reaction with isocyanate in a process of this type, so that uniform distribution of the formaldehyde resin and polyurethane elements in the condensation product can no longer be achieved.

It has now been found, surprisingly, that it is possible to manufacture, on the basis of aminoplast and polyisocyanate, foams which, apart from the $CO_2$ supplied by the reaction of the polyisocyanate with water, require no further foaming agent, if the aminoplast component is employed as an aqueous solution, the amount of polyisocyanate is so chosen that a significant reaction takes place both with the methylol groups of the precondensate and with the water and, moreover, an "acid" catalyst is added to the polyisocyanate separately from the aminoplast precondensate. In this case it is not necessary to evaporate water from the aminoplast component. It is particularly surprising that the acid curing proceeds completely satisfactorily even when the reaction mixture contains polyols, since, as already mentioned, the view hitherto has been that "acid" curing agents in the polyisocyanate/polyol system retard the formation of polyurethane.

The subject of the present invention is, thus, in a process for production foamed plastics with improved combustion characteristics by a condensation reaction of aminoplast resins with isocyanates which are at least bifunctional, the improvement comprising using as starting material an aqueous solution of a precondensate of formaldehyde with an aminoplast forming compound selected from the group consisting of urea and melamine, which solution contains from 0.5 to 20 parts by weight of the precondensate per part by weight of water, adding to the isocyanate or its mixture with the aqueous solution of the precondensate but separately from the solution of the precondensate an acid catalyst in an amount of 1 part by weight per at least 20 parts by weight of the precondensate and condensing the precondensate with the isocyanate at temperatures of between 20° to 100° C., whereby the ratio of precondensate to isocyanate used is from 0.20 to 15:1.

In the sense of the present invention, aminoplast precondensates are to be understood as all those water-soluble-N-methylol compounds which are known as starting materials for urea-and/or melamine-formaldehyde resins and are marketed under a number of trade names. These precondensates used according to the invention are those which either have unlimited solubility or at least are soluble in the amount of water according to the invention, that is to say they are relatively low-molecular condensation products with free methylol groups, such as are obtained, for example, from condensations reactions at pH values from the neutral point to weakly alkaline. For typical examples see, for example, Houben-Weyl, Methoden der organischen Chemie (Methods of Organic Chemistry), Georg Thieme-Verlag, Volume 14, page 348 et seq. (urea) and page 365 et seq. (melamine). With regard to the number of methylol groups, the aminoplast component should contain at least one $CH_2OH$ group per molecule and on average two such groups per molecule are desirable. With regard to the molar ratio of aminoplast-forming agent/formaldehyde, this should appropriately be greater than 1 when urea is used and greater than 2 when melamine is used. In all cases, however, a large excess of formaldehyde would be unfavourable, but the H atoms in all the NH groups can be replaced by $CH_2OH$ groups. Moreover, reference is made to the numerous variants for the manufacture of these precondensates and especially to the possible variants with regard to the adjustment of the pH value, such as are also indicated in Kunststoff-Handbuch (Plastics Handbook), Carl Hanser-Verlag, Volume X, page 151 et seq..

Thus, within the scope of the manufacturing processes described, it is possible to vary the set pH within relatively wide limits. Within the sense of the illustrations given above, the molar ratio is also not critical, that is to say it is possible within the scope of the process according to the invention to use all of the commercially available precondensates obtained from formaldehyde on the one hand and urea or melamine on the other hand. The lighter the foam to be manufactured is to be, the lower should be the degree of condensation of the particular precondensates employed. The water content of the precondensate solution is important inasmuch as it should, on the one hand, be adequate to give, with appropriate amounts of isocyanate, $CO_2$ in an amount such that an adequate "chemical" blowing effect takes place; on the other hand, the water content may not be so high that the foam which is formed collapses again. In general, aminoplast solutions containing between 0.5 and 20 parts by weight of aminoplast precondensate per 1 part by weight of water can be used, that is to say it is also possible, without difficulty, to use precondensate solutions in the form in which they are available commercially.

Thus, in contrast to the previous state of the art, it is completely superfluous to evaporate these solutions before they are used in order to reduce the water content.

With regard to the organic isocyanates which are to be reacted with the aminoplast precondensates, it is possible, in principle, because of their known high reactivity, to use all of those which are known in the literature and especially those which have already been described as foam components. Compounds of this type are described, for example, in U.S. Pat. Spec. No. 2,906.717 and are mentioned in even more detail in DT-OS 2,421,986. As preliminary experiments have shown, it would in principle be possible to use all of these compounds within the scope of the process according to the invention. However, for reasons of economy and industrial accessibility, those such as 2,4- and 2,6-tolylene diisocyanate ("TDI") and especially 4,4'-diphenylmethane diisocyanate ("MDI"), which may be in the crude form, and polymethylenepolyphenylene isocyanate ("PAPI") are preferred. In various information leaflets, these products are characterised by their NCO content, their viscosity and the like. If isomers are possible, as, say, in the case of tolylene diisocyanate, the isomer ratio is usually also indicated.

These specifications are sufficient to enable those skilled in the art to use these compounds within the scope of the present process. The weight ratio of aminoplast precondensate to isocyanate is also important for carrying out the process according to the invention and this ratio must be so chosen that, under the action of the catalyst, on the one hand an optimum condensation reaction takes place between the reactants but, on the other hand, the blowing reaction, that is to say the reaction of the isocyanate with the water present from the aminoplast precondensate solution with the evolution of adequate amounts of $CO_2$ for satisfactory foam formation proceeds in an optimum manner.

It has been found that the object according to the invention is most likely to be achieved with a ratio of 0.20 to 15 parts by weight and preferably of 1 to 13 parts by weight of the aminoplast precondensate per one part by weight of isocyanate.

Acid catalysts which can be used are, in particular, mineral acids, such as hydrochloric acid, sulphuric acid and phosphoric acid, medium strength to strong organic acids, such as p-toluenesulphonic acid, formic acid and oxalic acid, and salts of polybasic inorganic and organic acids, such as mono-ammonium phosphate or the monosodium salt of citric acid, as well as the so-called latent curing agents, such as, for example, ammonium chloride, and also Lewis acids, such as boron trifluoride and the like. In addition, of course, it is possible to use all those compounds which form acids on addition to the aqueous reaction mixture, such as, for example, the phosphorus/halogen compounds ($PCl_3$, $POCl_3$ and the like) and also thionyl chloride, the acid chlorides of organic carboxylic acids, such as benzoyl chloride, sulphonic acids and the anhydrides of inorganic and organic acids and, of course, combinations of the said compounds. Phosphoric acid, ammonium chloride and phosphorus trichloride are particularly suitable on the one hand, above all because of their simple handling and their reactivity. The amounts employed are between 0.01–2 parts by weight and preferably between 0.05–1 part by weight, relative to 1 part of isocyanate. In themselves, the three components isocyanate, the aqueous solution of the aminoplast precondensate and the acid catalyst suffice for the manufacture of the foams according to the invention. In many cases the addition of polyols such as are in themselves already known in polyurethane chemistry, such as, for example, polyester- or polyether-polyols, as further reactants, on their own or as a mixture, has proved very useful in order to improve the mechanical properties of the end products athough, as mentioned, it was to be expected that the use, according to the invention, of acid curing agents would inhibit the condensation reaction between the isocyanate component and the polyol component. The amount by weight of polyol : isocyanate can be up to 20 parts by weight of polyol per one part by weight of isocyanate and preferably 1 to 15 parts by weight per part of isocyanate. Additives of the type generally customary in the manufacture of foams are foam stabilisers, cell regulating agents, thickeners, plasticisers, pigments, fillers and the like and, if necessary, also physical blowing agents. Water-miscible organic solvents, such as, say, acetone, dimethylformamide or the like, can likewise also be used.

The manufacture of the foams according to the invention is appropriately effected by simple stirring of the components, preferably at temperatures between 20° and 70° C., the addition of the acid curing agent having, as explained above, to be effected separately from the aminoplast precondensate. Apart from this compelling measure, it is immaterial whether the aminoplast solution is first mixed with the polyisocyanate and the acid curing agent is then added or whether the acid curing agent is added together with the polyisocyanate to the aminoplast precondensate and different variants are possible, depending on the desired quality of the end product and the nature of the given apparatus for foam manufacture.

In the case of co-condensation of polyol into the system according to the invention, it is possible, under the action of the acid curing agent, to premix the isocyanate component with the polyol and only then to add the aminoplast precondensate solution. It is also possible to mix the polyol with the aminoplast precondensate and to add this mixture to the polyisocyanate, which already contains the acid curing agent. It is also completely within the scope of the invention to use isocyanate/polyol prepolymers, such as are described, for example, in Kunststoffhandbuch Bd.VII "Polyurethane" (Plastics Handbook, Volume VII "Polyurethanes"), 1966, page 113, as the starting materials. The manufacture of the foams according to the invention is effected with the machines customary in the foam industry, for examle on two-component urethane foam machines and the like, on an industrial scale.

The examples which follow are intended to illustrate the process according to the invention in more detail.

EXAMPLE 1

A solution containing 1.6 parts by weight of a melamine/formaldehyde precondensate per one part by weight of water (molar ratio melamine:formaldehyde, 1:2) was mixed with diphenylmethane diisocyanate (30% of isocyanate groups) and subsequently the catalyst (ammonium chloride) was stirred in. The mixture was warmed to 78° C. and foamed using a mechanical stirrer.

For this reaction 6 parts by weight of the aminoplast precondensate, based on the anhydrous product, and 0.03 part by weight of catalyst were employed per one part by weight of the isocyanate:
Course of the foaming reaction:
start time:2.5 minutes
rise time:10 minutes
tack-free time:about 12 minutes
density:110 kg/m$^3$

EXAMPLE 2

A solution containing 1.6 parts by weight of a melamine/formaldehyde precondensate per one part by weight of water (molar ratio melamine : formaldehyde, 1:2) was mixed with a polyetherpolyol (hydroxyl number 420) and diphenylmethane diisocyanate (30% of CNO groups) and subsequently the catalyst (phosphoric acid) was stirred in and the mixture was warmed to 40° C. Foaming was again effected using a mechanical stirrer. 13 parts by weight of the aminoplast precondensate, based on the anhydrous product, 1.5 parts by weight of the polyol and 0.5 part by weight of the catalyst were employed per 1 part by weight of the isocyanate:
Course of the foaming reaction:
start time:3 minutes
rise time:15 minutes
density:120 kg/m$^3$ In an analogous manner and by varying the quantity ratios of the individual components, and especially the ratio of aminoplast precondensate:isocyanate, within the limits claimed, end products with densities of down to about 25 kg/m$^2$ were obtained with start times of 1 to 2 minutes and rise times of between 5 and 10 minutes.

EXAMPLE 3

Tolylene diisocyanate (45% of NCO groups) and a polyether-polyol (hydroxyl number 420) were stirred mechanically for 30 seconds at 40° C. and the melamine/formaldehyde precondensate according to Example 1 and 2 and also, subsequently, the catalyst (phosphoric acid) were then added and the mixture was foamed. 5.6 parts by weight of the aminoplast precondensate, based on the anhydrous product, and 1.5 parts by weight of polyol and also 0.15 part by weight of the catalyst were employed per 1 part by weight of isocyanate:
Course of the foaming reaction:
start time:0.5 minute
rise time:5 minutes
density:42 kg/m$^3$

EXAMPLE 4

The aqueous solution of a urea/formaldehyde condensation product containing 3 parts by weight of condensation product per 1 part by weight of water and the aqueous solution of a melamine/formaldehyde condensation product ("Madurit R" from Messrs. Cassella) containing 1.5 parts by weight of condensation product per 1 part by weight of water were mixed with a polyether-polyol (hydroxyl number 420) and also small amounts of an emulsifier and negligible amounts of water. A mixture of diphenylmethane diisocyanate (30% of CNO groups) with 0.05 part by weight of PCl$_3$ relative to 1 part by weight of isocyanate was then added to the mixture mentioned above and the whole was stirred intensively in a laboratory vessel at room temperature.

1.21 parts by weight of the urea/formaldehyde precondensate and 0.32 part by weight of the melamine/formaldehyde precondensate, based on the anhydrous product, 0.5 part of polyol and also 0.05 part by weight of catalyst, 0.2 part by weight of additional water and 0.01 part by weight of emulsifier were employed per 1 part by weight of isocyanate:
Course of the foaming reaction:
start time:3 minutes
rise time:7 minutes
density:22 kg/m$^2$ The tack-free times in Examples 2, 3 and 4 were, as in Example 1, of the same order of magnitude as the rise times.

All the foam products proved to be self-extinguishing. The results achieved in the laboratory can readily be transferred to foaming machines of known construction after appropriate preliminary tests.

What we claim is:

1. In a process for production foamed plastics with improved combustion characteristics by a condensation reaction of aminoplast resins with isocyanates which are at least bifunctional, the improvement comprising using as starting material an aqueous solution of a precondensate of formaldehyde with an aminoplast forming compound selected from the group consisting of urea and melamine, which solution contains from 0.5 to 20 parts by weight of the precondensate per part by weight of water, adding to the isocyanate or its mixture with the aqueous solution of the precondensate but separately from the solution of the precondensate an acid catalyst in an amount of 1 part by weight per at least 20 parts by weight of the precondensate and condensing the precondensate with the isocyanate at temperatures of between 20° to 100° C., whereby the weight ratio of precondensate to isocyanate used is from 0.20 to 15:1.

2. A process according to claim 1, in which a polyol-compound is also added to the isocyanate or its mixture with the precondensate.

3. A process according to claim 1, in which the isocyanate used is tolylene diisocyanate.

4. A process according to claim 1, in which the isocyanate employed is diphenylmethane diisocyanate.

5. A process according to claim 1, in which the ratio of precondensate:polyisocyanate is from 1 to 13:1.

6. A process according to claim 1, in which the acid catalyst used is phosphoric acid.

7. A process according to claim 1, in which the acid catalyst used is phosphorus trichloride.

8. A process according to claim 1, in which the acid catalyst used is ammonium chloride.

9. A process according to claim 2, in which the polyol is added to the reaction mixture in a weight ratio of polyol:isocyanate of 1 to 15:1.

* * * * *